(12) United States Patent
Chuang

(10) Patent No.: US 7,469,591 B1
(45) Date of Patent: Dec. 30, 2008

(54) TWO-IN-ONE TEMPERATURE AND PRESSURE GAUGE

(76) Inventor: Chien-Huang Chuang, No. 31, Lane 203, Sec. 4, Sanhe Rd., Sanchong City, Taipei County 241 (TW)

( * ) Notice: Subject to any disclaimer, the term of this patent is extended or adjusted under 35 U.S.C. 154(b) by 0 days.

(21) Appl. No.: 11/967,552

(22) Filed: Dec. 31, 2007

(51) Int. Cl.
*G01L 7/04* (2006.01)
(52) U.S. Cl. ............................. 73/732; 73/700; 374/143
(58) Field of Classification Search ................. 73/700, 73/732; 374/143
See application file for complete search history.

(56) References Cited

U.S. PATENT DOCUMENTS 3,209,595 A * 10/1965 Harland ..................... 374/143
3,354,716 A * 11/1967 Wiebe et al. ................ 374/142
4,682,501 A * 7/1987 Walker ......................... 73/708
5,895,861 A * 4/1999 Slonaker ...................... 73/732

FOREIGN PATENT DOCUMENTS

DE 20006580 U1 * 7/2000

* cited by examiner

*Primary Examiner*—Andre J Allen
(74) *Attorney, Agent, or Firm*—Rabin & Berdo, P.C.

(57) ABSTRACT

A two-in-one temperature and pressure gauge is constituted primarily by a shell, a housing, a score panel, a needle set, a temperature sensing mechanism, and a pressure sensing mechanism. The needle set includes two needles which are coaxially installed, with one needle being connected with the temperature sensing mechanism, and the other needle being connected with the pressure sensing mechanism. The invention can be both used as the temperature gauge and the pressure gauge at a same time, a space for installing gauge sets can be decreased, and manufacturing cost can be reduced.

5 Claims, 6 Drawing Sheets

TWO-IN-ONE TEMPERATURE AND PRESSURE GAUGE

BACKGROUND OF THE INVENTION a) Field of the Invention

The present invention relates to a two-in-one temperature and pressure gauge, and more particularly to an industrial sensing gauge which is both provided with a temperature sensing function and a fluid pressure sensing function, wherein needles are coaxially disposed between a shell, a housing, and a score panel to facilitate viewing and utilizing, so as to achieve effects of decreasing a space for installing gauge sets and reducing manufacturing cost.

b) Description of the Prior Art

A conventional industrial temperature gauge and a pressure gauge are two independent units. Each of them includes a round shell and a housing, within which is provided with a score panel and a needle. The needle is rotated by a temperature sensing mechanism or a pressure sensing mechanism. However, when the aforementioned two independent gauges are used at a same time, two gauge positions should be taken, and each gauge should be provided with a shell, a housing, and a score panel; hence, they are installed redundantly, and thereby increasing labor hours for assembling and wasting an installation space and cost of parts.

SUMMARY OF THE INVENTION

Accordingly, the primary object of the present invention is to provide a two-in-one temperature and pressure gauge, wherein two coaxially installed needles are located inside a shell, a housing, and a score panel to indicate temperature and pressure at a same time, thereby achieving effects of decreasing a space for installing gauge sets and reducing manufacturing cost.

Accordingly, a two-in-one temperature and pressure gauge of the present invention includes primarily a shell, a housing, a score panel, a needle set, a temperature sensing mechanism, and a pressure sensing mechanism, wherein the needle set is composed of two needles that are installed coaxially, with one needle being connected with the temperature sensing mechanism, and the other needle being connected with the pressure sensing mechanism.

Upon implementing according to the aforementioned structures, the shell, the housing, and the score panel are common parts, the needle set includes two needles that are installed coaxially, and are connected respectively with the temperature sensing mechanism and the pressure sensing mechanism to indicate a temperature value and a pressure value at a same time, so as to be both used as the temperature gauge and the pressure gauge, thereby reducing the costs of manufacturing and parts, decreasing the space for installing the gauge sets, and diminishing labor hours of installation, upon assembling for use.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
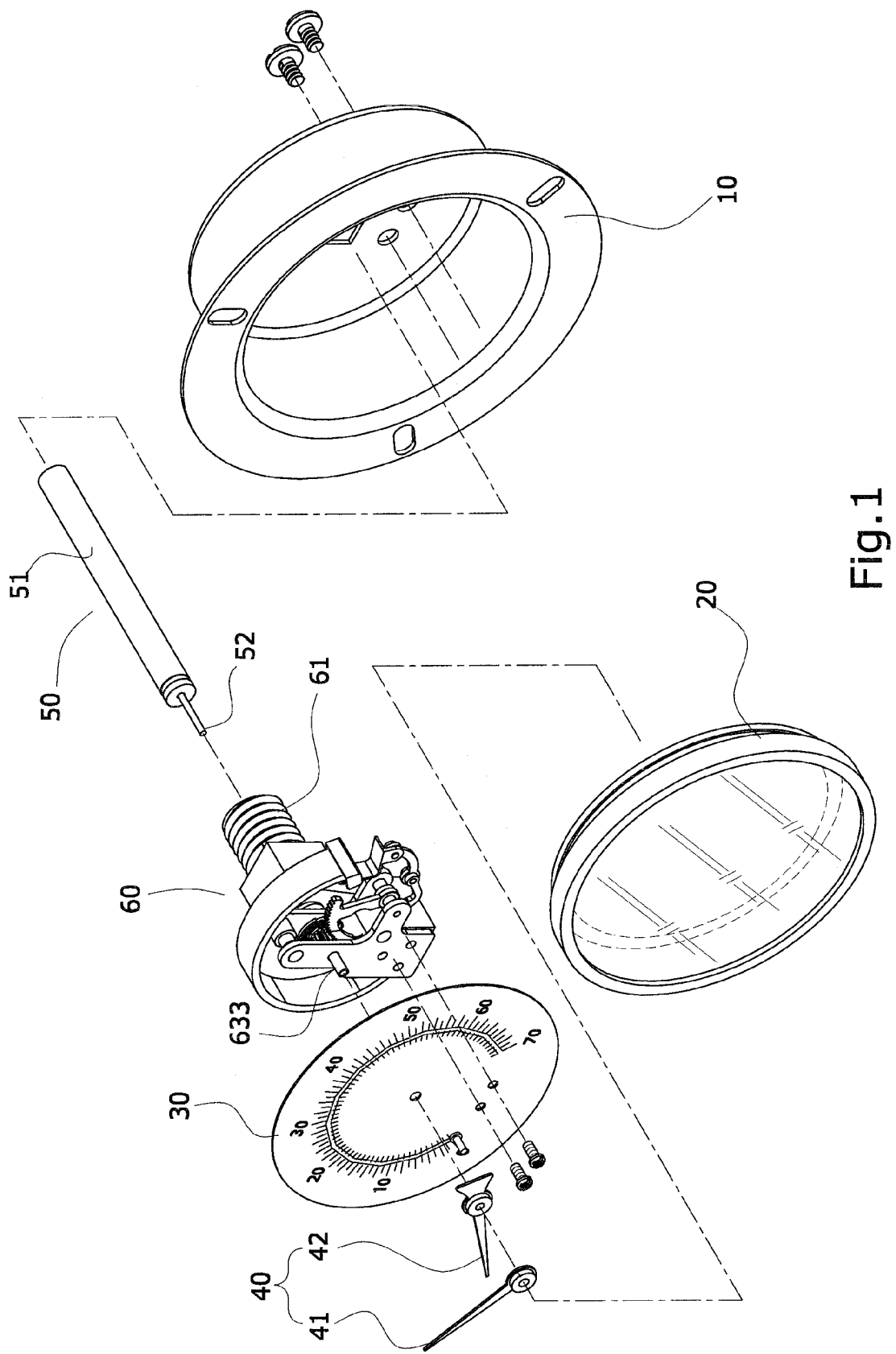
FIG. 1 shows an exploded view of an embodiment of the present invention.

Referring to FIG. 1, a two-in-one temperature and pressure gauge of this embodiment comprises primarily a shell 10, a housing 20, a score panel 30, a needle set 40, a temperature sensing mechanism 50, and a pressure sensing mechanism 60. Upon assembling, the needle set 40 is put in front of the score panel 30, and is connected with the temperature sensing mechanism 50 and the pressure sensing mechanism 60 at a rear side of the score panel 30, so as to be rotatable. Next, the aforementioned assembly is put into the shell 10 for fixing, with an outer tube 51 of the temperature sensing mechanism 50 and a tube connector 61 of the pressure sensing mechanism 60 being exposed out of the shell 10. Finally, the housing 20 is covered on a front of the shell 10, thereby accomplishing the assembling. The temperature sensing mechanism 50 is assembled inside the pressure sensing mechanism 60, allowing a rotation shaft 52 of the temperature sensing mechanism 50 to be coaxially installed with a rotation shaft 633 of the pressure sensing mechanism 60. The needle set 40 includes two needles 41, 42 which are coaxially installed, with one needle 41 being connected with the rotation shaft 52 of the temperature sensing mechanism 50, and the other needle 42 being connected with the rotation shaft 633 of the pressure sensing mechanism 60.

Figure 2:
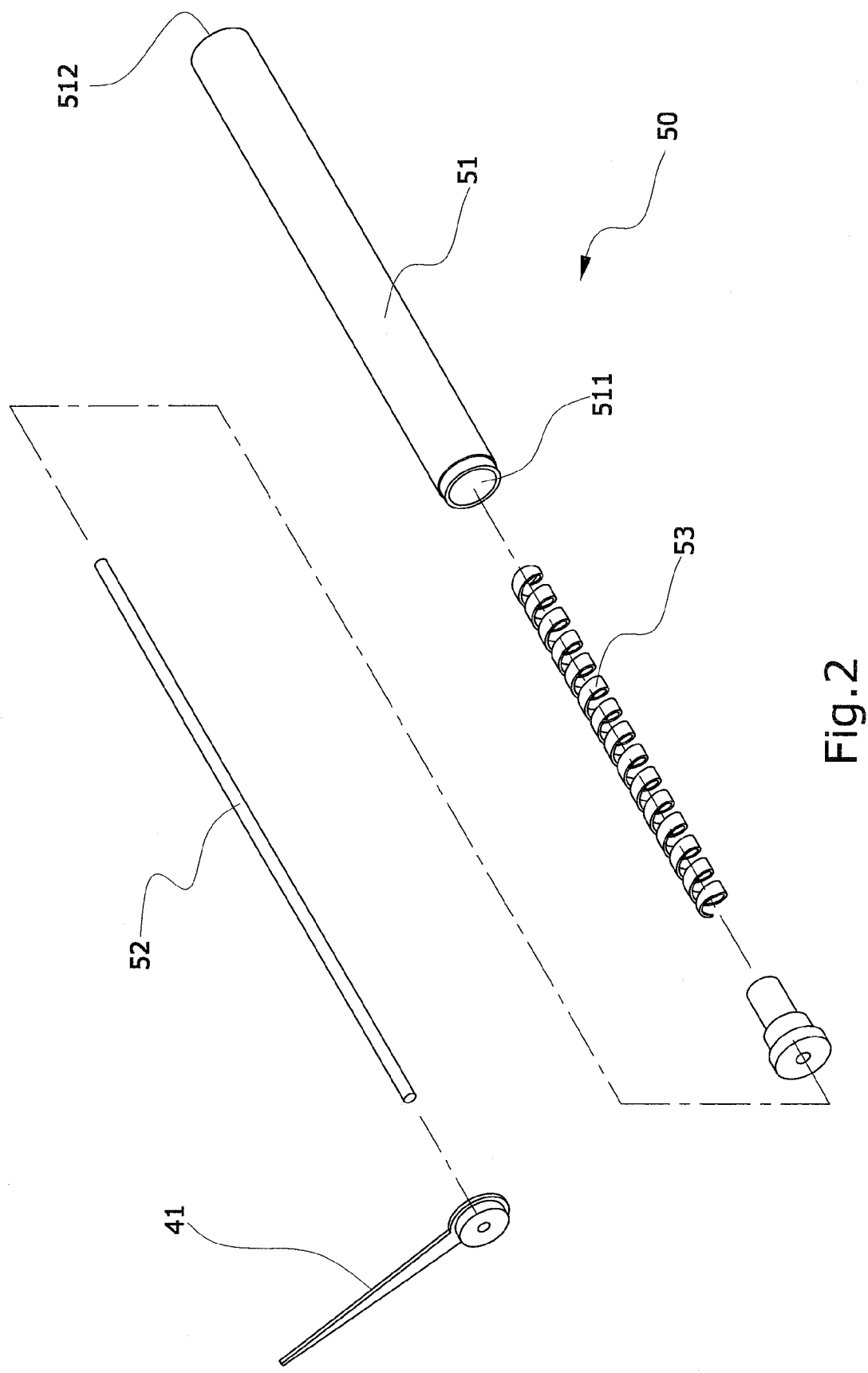
FIG. 2 shows an exploded view of a temperature sensing mechanism in FIG. 1.

Accordingly, as shown in FIG. 2, the temperature sensing mechanism 50 is composed of the outer tube 51, the rotation shaft 52, and a heat sensitive metal reed 53. An end of the outer tube 51 is an opening end 511 with an end cap, whereas the other end is a closed end 512. The rotation shaft 52 is disposed inside the outer tube 51, and its front end is exposed out of the outer tube 51 to be connected with the needle 41. The heat sensitive metal reed 53 is a spiral tube and is sheathed between the outer tube 51 and the rotation shaft 52, with an end being fixed at the opening end 511 of the outer tube 51 (can be fixed on a tube wall or the end cap of the outer tube), and the other end being connected with a rear end of the rotation shaft 52.

Figure 3:
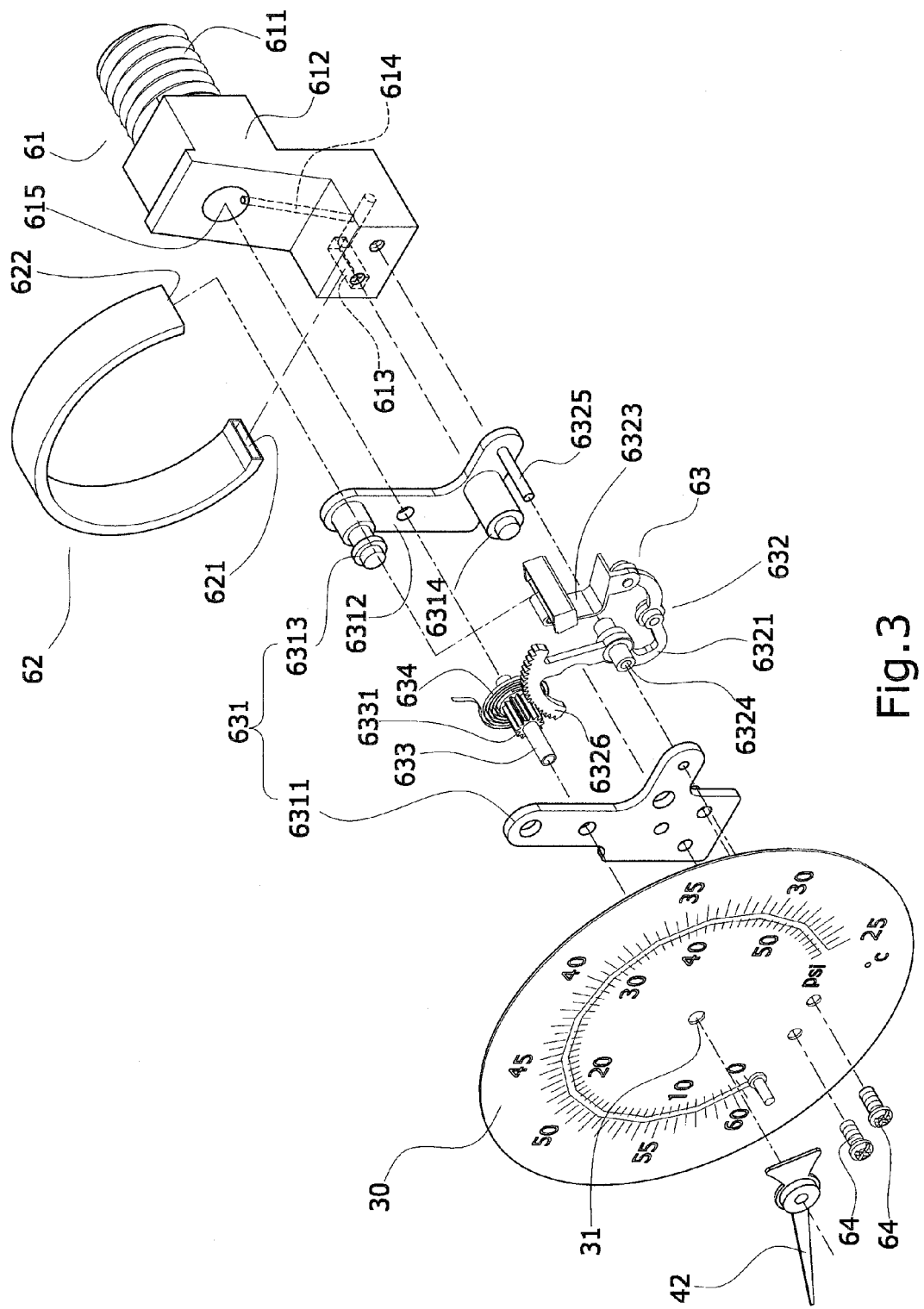
FIG. 3 shows an exploded view of a pressure sensing mechanism in FIG. 1.

Referring to FIG. 3, the pressure sensing mechanism 60 includes a connector body 61, a flat bourdon tube 62, and a link mechanism 63, wherein an end of the connector body 61 is provided with a tube connector 611 within which is a shaft hole 615 for assembling the aforementioned temperature sensing mechanism 50, and the other end is extended downward with a block unit 612, a side of which is provided with a flat hole 613. A blind hole 614 is disposed between and connected through the shaft hole 615 and the flat hole 613 of the tube connector 611, and the flat bourdon tube 62 is bended into an arc shape, with an end being an opening end 621 which is fixed on the flat hole 613 at a side of the connector body 61, and the other end being a closed end 622. The link mechanism 63 includes a bracket 631, a link crank set 632, a rotation shaft 633, and a spring 634. The bracket 631 is assembled by two plates 6311, 6312 between which are provided with two support shafts 6313, 6314, for assembling all parts. The bracket 631 is assembled with the connector body 61 and the score panel 30 into one unit by screws 64. The link crank set 632 includes a crank 6321, a link rod 6322, and an assembly member 6323, which are connected together. The link crank set 632 is pivoted at a side of the bracket 631 with a pivot 6325 by a shaft hole 6324 in a center of the crank 6321, and an outer side end of the crank 6321 is an outer gear 6326 which is approximately a quarter of a circle. An outer side end of the assembly member 6323 is connected with the closed end 622 of the flat bourdon tube 62. The rotation shaft 633 is a hollow shaft and is pivoted on the bracket 631, with an end being protruded outward to pass through a central hole 31 of the score panel 30 to be assembled with the needle 42. An outer wall surface of the rotation shaft 633 is provided with a small gear 6331 to be gnawed with the outer gear 6326 of the link crank set 632. The spring 634 is in a vortex shape and is sheathed on the rotation shaft 633, with an inner side end being connected with the rotation shaft 633, and an outer side end being connected and fixed on one support shaft 6313 of the bracket 631.

Accordingly, after the tube connector 611 is connected with a pipe line of fluid to be detected, fluid pressure will be transmitted into the flat bourdon tube 62 from the shaft hole 615 in the tube connector 61, through the blind hole 614. The flat bourdon tube 62 will result in a deformation of different extent depending on a magnitude of the pressure, which further drives the crank 6321 of the link mechanism 63 to rotate by an angle, and gnaws the outer gear 6326 with the small gear 6331 for transmission, thereby driving the needle 42 to point at a corresponding pressure score.

Figure 4:
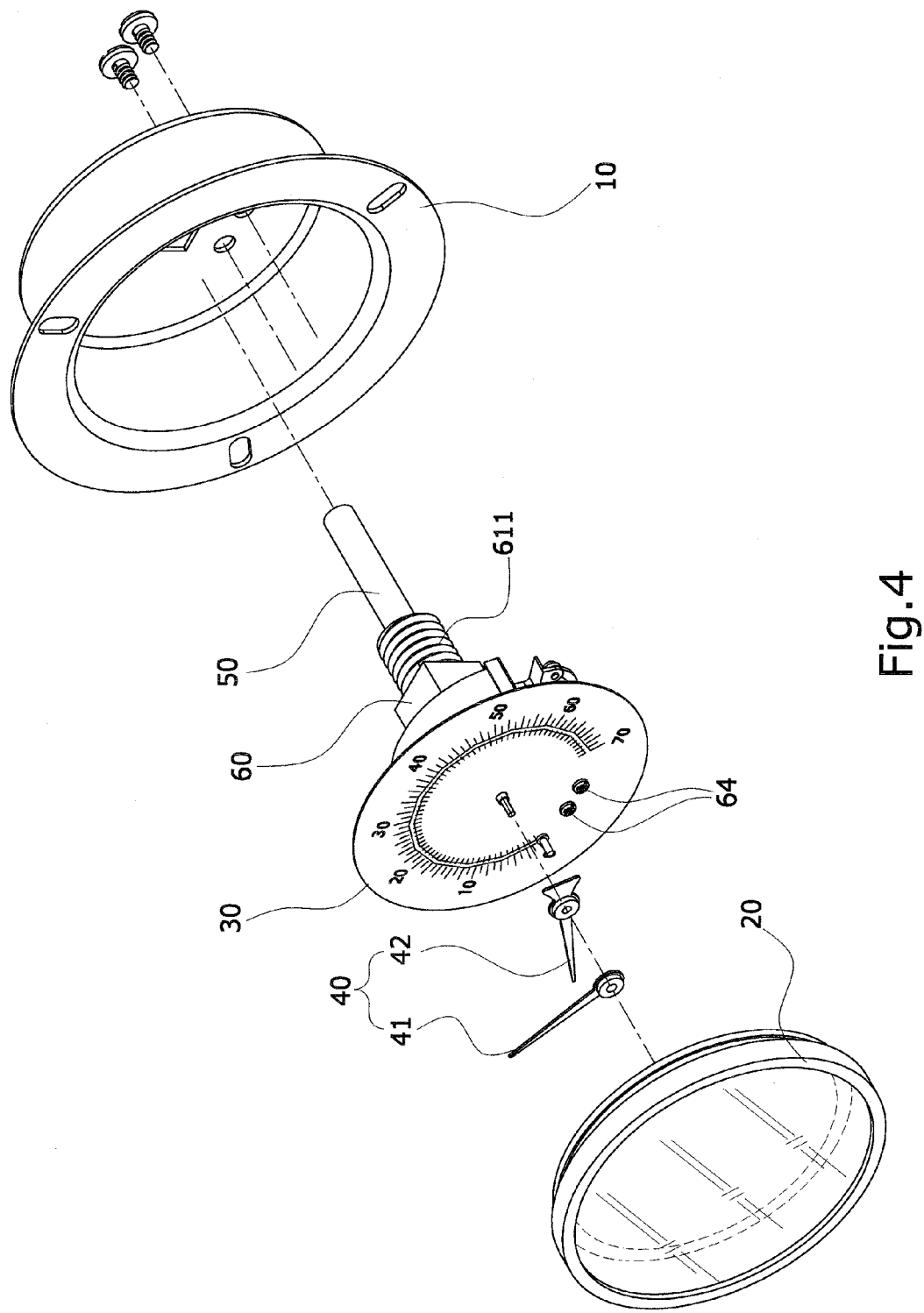
FIG. 4 shows a local perspective view of the present invention, before being assembled.
Figure 5:
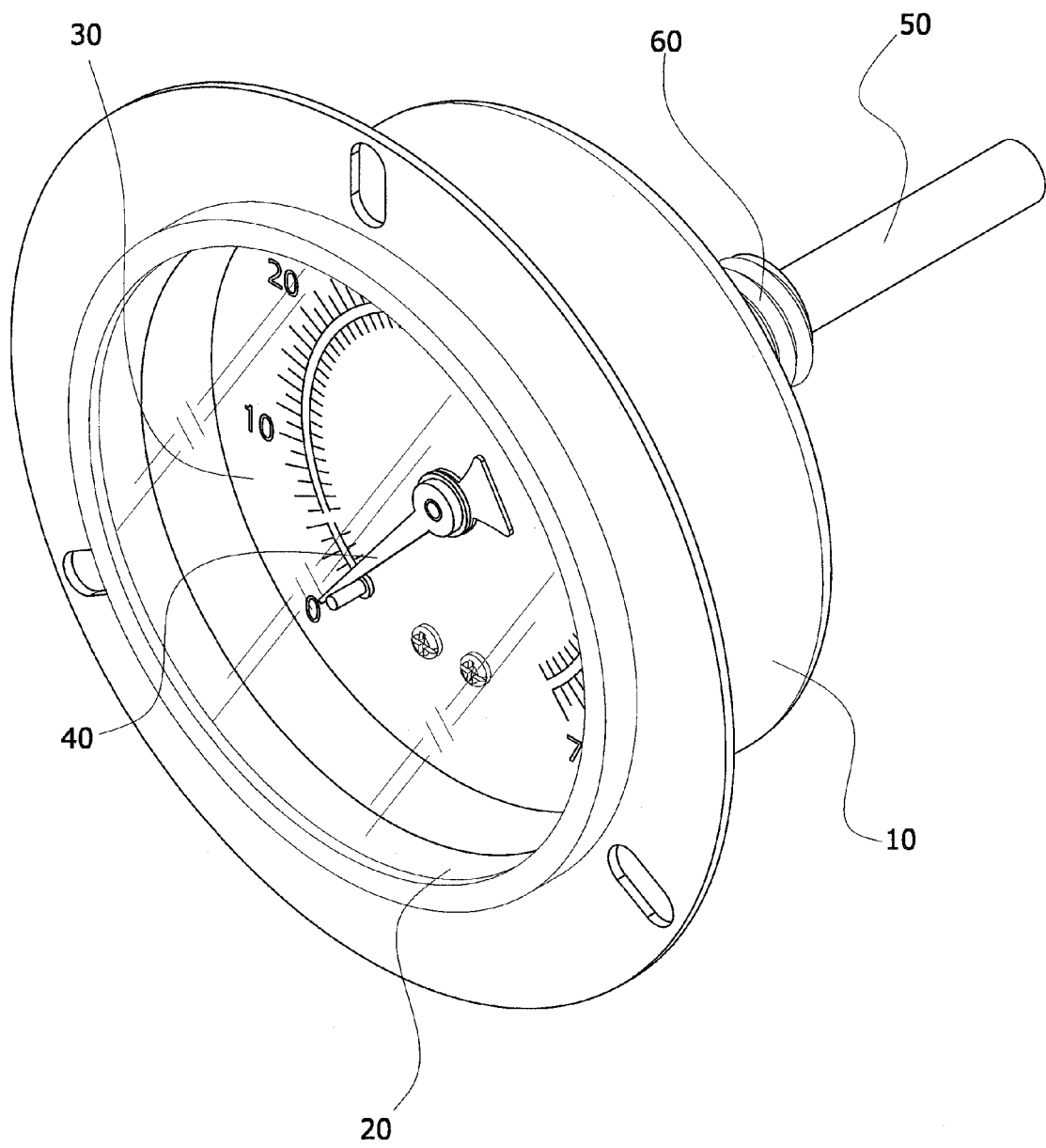
FIG. 5 shows a perspective view of the present invention, after being assembled.

Referring to FIG. 2 and FIG. 3, when assembling the temperature sensing mechanism 50 and the pressure sensing mechanism 60, an axis of the tube connector 611 of the pressure sensing mechanism 60 is corresponding to an axis of the rotation shaft 633 of the link mechanism 63, and the temperature sensing mechanism 50 is installed into the shaft hole 615 of the tube connector 611 of the pressure sensing mechanism 60. In addition, after the exposure end of the rotation shaft 52 passes through the axis of the rotation shaft 633 of the link mechanism 63, the two rotation shafts 633, 52 pass through at a same time the central hole 31 of the score panel 30, and then, the score panel 30 is assembled with the pressure sensing mechanism 60 into one unit with the screws 64 (as shown in FIG. 4). Next, the end parts of two rotation shafts 633, 52 are connected respectively with the needles 42, 41. Then, gaps at front and rear ends of the tube connector 611 which is transfixed with the temperature sensing mechanism 50 are sealed, followed by putting the aforementioned assembly into the shell 10 for fixing (as shown in FIG. 5), and allowing the outer tube 51 of the temperature sensing mechanism 50 and the tube connector 611 of the pressure sensing mechanism 60 to be exposed out of the shell 10. Finally, the housing 20 is covered on a front of the shell 10 to accomplish the entire assembling. Moreover, according to the aforementioned entire structure, a connection surface between the tube connector 611 and the shell 10 as well as a connection surface between the shell 10 and the housing 20 are provided with leak-proof gaskets or rubber rings (which are prior arts, and therefore are omitted in the drawings), such that a space between the shell 10 and the housing 20 can be filled with non-combustible liquid oil, such as lubricant oil, so as to improve a lifetime of usage of the internal parts.

Figure 6:
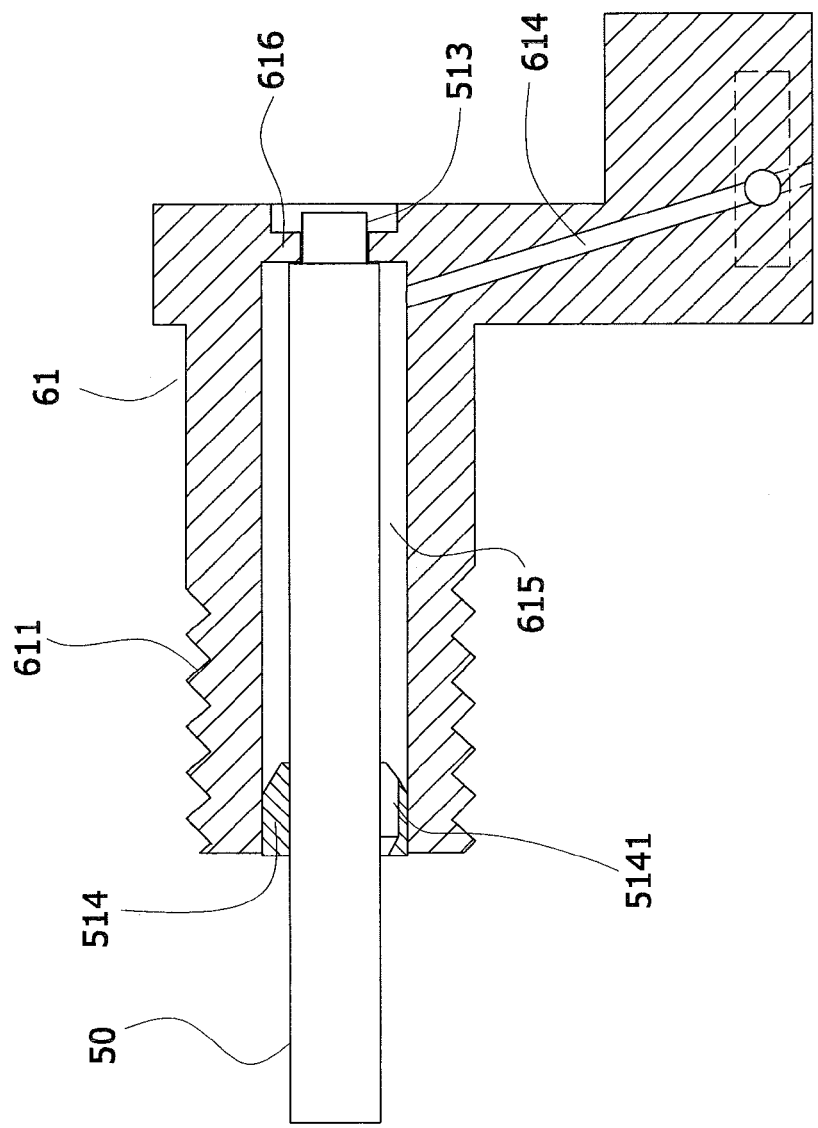
FIG. 6 shows a cutaway view of a temperature sensing mechanism which is assembled at a pressure sensing mechanism.

On the other hand, referring to FIG. 6, when the temperature sensing mechanism 50 is assembled into the connector body 61 of the pressure sensing mechanism 60, in order to allow gas to be detected to be successfully fed into the flat bourdon tube 62 from the opening at the rear end of the tube connector 611 along its shaft hole, through the blind hole 614, and to assure that there will be no gas leak after assembling the temperature sensing mechanism 50, an inner diameter of the shaft hole 615 of the tube connector 611 is larger than an outer diameter of the outer tube 51 of the temperature sensing mechanism 50 in implementation, and a front end of the shaft hole 615 of the tube connector 611 is provided with an inner rim 616 which is protruded inward, such that the tube connector 611 can be sheathed with a neck part 513 of a reduced diameter at the front end of the outer tube 51 by the inner rim 616. In addition, a rear end of the outer tube 51 of the temperature sensing mechanism 50 is sheathed with a ring member 514, and an inner wall surface of the ring member 514 is provided with a gas hole 5144 which is parallel with its axis. When assembling, a groove ring will be formed between the inner rim 616 at the front end of the shaft hole of the connector body 61 and the neck part 513 of the outer tube 51, and the groove ring can be filled with a soldering material (tin, copper, or stainless steel, etc.) to fix the temperature sensing mechanism 50 and to prevent air which enters into the shaft hole 615 of the connector body 61 from leaking out. On the other hand, by sheathing the ring member 514 into the shaft hole 615 of the connector body 61 at a same time when the ring member 514 is sheathed at the rear end of the outer tube 51, precision of a coaxial installation can be maintained, and by using the gas hole 5141 that is located in the inner surface of the ring member 514, the gas to be detected can easily enter into the shaft hole 615, thereby achieving an object of detecting the gas pressure.

Upon implementing according to the aforementioned structures, the shell 10, the housing 20, and the score panel 30 are common parts shared by the temperature sensing mechanism 50 and the pressure sensing mechanism 60, and the two needles 41, 42 of the needle set 40 are coaxially installed, as well as are connected respectively with the rotation shaft 52 of the temperature sensing mechanism 50 and the rotation shaft 633 of the pressure sensing mechanism 60 for rotation, such that a temperature value and a pressure value can be displayed at a same time on a same structure that the structures can be both used as the temperature gauge and the pressure gauge, costs of manufacturing and parts can be decreased, a space for installing gauge sets can be reduced, and labor hours for installation can be diminished, when assembling for use.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A two-in-one temperature and pressure gauge comprising a shell, a housing, a score panel, a needle set, a temperature sensing mechanism, and a pressure sensing mechanism, wherein, upon assembling, the needle set is installed on a front of the score panel and is connected with the temperature sensing mechanism and the pressure sensing mechanism located at a rear side of the score panel, for rotation; after that, the aforementioned assembly being put into the shell for fixing, and allowing an outer tube of the temperature sensing mechanism and a tube connector of the pressure sensing mechanism to be exposed out of the shell; finally, the housing being covered on a front of the shell; the temperature sensing mechanism being assembled into the pressure sensing mechanism, allowing a rotation shaft of the temperature sensing mechanism and a rotation shaft of the pressure sensing mechanism to be installed coaxially; the needle set including two coaxially installed needles, with one needle being connected with the rotation shaft of the temperature sensing mechanism, and the other needle being connected with the rotation shaft of the pressure sensing mechanism.

2. The two-in-one temperature and pressure gauge according to claim 1, wherein the temperature sensing mechanism includes an outer tube, a rotation shaft, and a heat sensitive metal reed, wherein an end of the outer tube is an opening end with an end cap, the other end is a closed end; the rotation shaft being put in the outer tube, and a front end being exposed out of the outer tube to be connected with the needle; the heat sensitive metal reed being a spiral tube and sheathed between the outer tube and the rotation shaft, with one end being fixed at the opening end of the outer tube, and the other end being connected with a rear end of the rotation shaft.

3. The two-in-one temperature and pressure gauge according to claim 1, wherein the pressure sensing mechanism includes a connector body, a flat bourdon tube, and a link mechanism, wherein an end of the connector body is provided with a tube connector within which is a shaft hole for assembling the temperature sensing mechanism, the other end is extended downward with a block unit, a side of which is provided with a flat hole, with a blind hole being disposed between and connected through the shaft hole of the tube connector and the flat hole; the flat bourdon tube being bended into an arc shape, with an end being an opening end which is fixed on the flat hole at a side of the connector body, and the other end being a closed end; the link mechanism including a bracket, a link crank set, a rotation shaft, and a spring, wherein the bracket is assembled by two plates between which are provided with two support shafts, for assembling all parts; the connector body being assembled with the score panel into one unit by screws; the link crank set being composed of a crank, a link rod, and an assembly member, and being pivoted at a side of the bracket with a pivot by a shaft hole in a center of the crank; an outer side end of the crank being an outer gear which is approximately a quarter of a circle; an outer side end of the assembly member being connected with the closed end of the flat bourdon tube; the rotation shaft being a hollow shaft and pivoted on the bracket, with one end being protruded outward to pass through a central hole of the score panel to be assembled with the needle, and an outer wall surface of the rotation shaft being provided with a small gear to be gnawed with the outer gear of the link crank set; the spring being in a vortex shape and sheathed on the rotation shaft, with an inner side end being connected with the rotation shaft, and an outer side end being connected and fixed on one support shaft of the bracket.

4. The two-in-one temperature and pressure gauge according to claim 1, wherein liquid oil is filled in the shell and the housing, after being assembled.

5. The two-in-one temperature and pressure gauge according to claim 1, wherein an inner diameter of the shaft hole of the tube connector is larger than an outer diameter of the outer tube of the temperature sensing mechanism, and a front end of the shaft hole of the tube connector is provided with an inner rim; a front end of the outer tube being provided with a neck part, a rear end being sheathed with a ring member, and an inner wall surface of the ring member being provided with a gas hole which is parallel with an axis of the ring member.

* * * * *